US008678267B2

(12) United States Patent
Heck et al.

(10) Patent No.: US 8,678,267 B2
(45) Date of Patent: Mar. 25, 2014

(54) SYSTEM AND METHOD FOR INTEGRALLY FORMING A STIFFENER WITH A FIBER METAL LAMINATE

(75) Inventors: David P. Heck, St. Charles, MO (US); Loren J. Strahm, Florrisant, MO (US)

(73) Assignee: The Boeing Company, Chicago, IL (US)

(*) Notice: Subject to any disclaimer, the term of this patent is extended or adjusted under 35 U.S.C. 154(b) by 573 days.

(21) Appl. No.: 12/249,740

(22) Filed: Oct. 10, 2008

(65) Prior Publication Data

US 2010/0092789 A1 Apr. 15, 2010

(51) Int. Cl.
*B23K 20/12* (2006.01)

(52) U.S. Cl.
USPC .......................................... 228/112.1; 228/2.1

(58) Field of Classification Search
USPC ................................ 228/112.1, 2.1, 119, 120
See application file for complete search history.

(56) References Cited

U.S. PATENT DOCUMENTS

| 5,207,371 | A | * | 5/1993 | Prinz et al. ..................... 228/125 |
| 5,713,507 | A | * | 2/1998 | Holt et al. ..................... 228/112.1 |
| 6,441,338 | B1 | * | 8/2002 | Rabinovich .................... 219/121.64 |
| 6,450,394 | B1 | * | 9/2002 | Wollaston et al. ............. 228/112.1 |
| 2002/0185207 | A1 | | 12/2002 | Iwanczyk et al. |
| 2003/0116609 | A1 | | 6/2003 | Dracup et al. |
| 2004/0041006 | A1 | * | 3/2004 | Masingale ..................... 228/112.1 |
| 2004/0265503 | A1 | * | 12/2004 | Clayton et al. ................. 427/446 |
| 2005/0127139 | A1 | * | 6/2005 | Slattery et al. ................. 228/112.1 |
| 2006/0037992 | A1 | | 2/2006 | Slattery |
| 2007/0187469 | A1 | * | 8/2007 | Chen et al. .................... 228/112.1 |
| 2008/0006741 | A1 | | 1/2008 | Martin et al. |
| 2008/0131656 | A1 | | 6/2008 | Walker et al. |

FOREIGN PATENT DOCUMENTS

| EP | 1336469 | 8/2003 |
| WO | PCTUS2009060102 | 10/2009 |

* cited by examiner

*Primary Examiner* — Aaron Austin
*Assistant Examiner* — Megha Mehta

(57) ABSTRACT

A unitized assembly comprises a fiber metal laminate having at least one additive layer deposited thereonto such as by friction stir welding. The fiber metal laminate comprises metallic and non-metallic plies and having an innermost metallic ply. The innermost metallic ply and the additive layer are each sized and configured to facilitate the generation of thermal energy sufficient to deposit the first additive layer to the innermost metallic ply during the friction stir welding process. The additive layer is sized and configured to minimize thermal loads in the innermost metallic ply during deposition thereof. The unitized assembly may be formed using a stock member such as a metallic plate from which the innermost metallic ply may be machined. The metallic and non-metallic plies may be laid up over the innermost metallic ply. The substructure elements may be machined from the metallic plate.

4 Claims, 14 Drawing Sheets

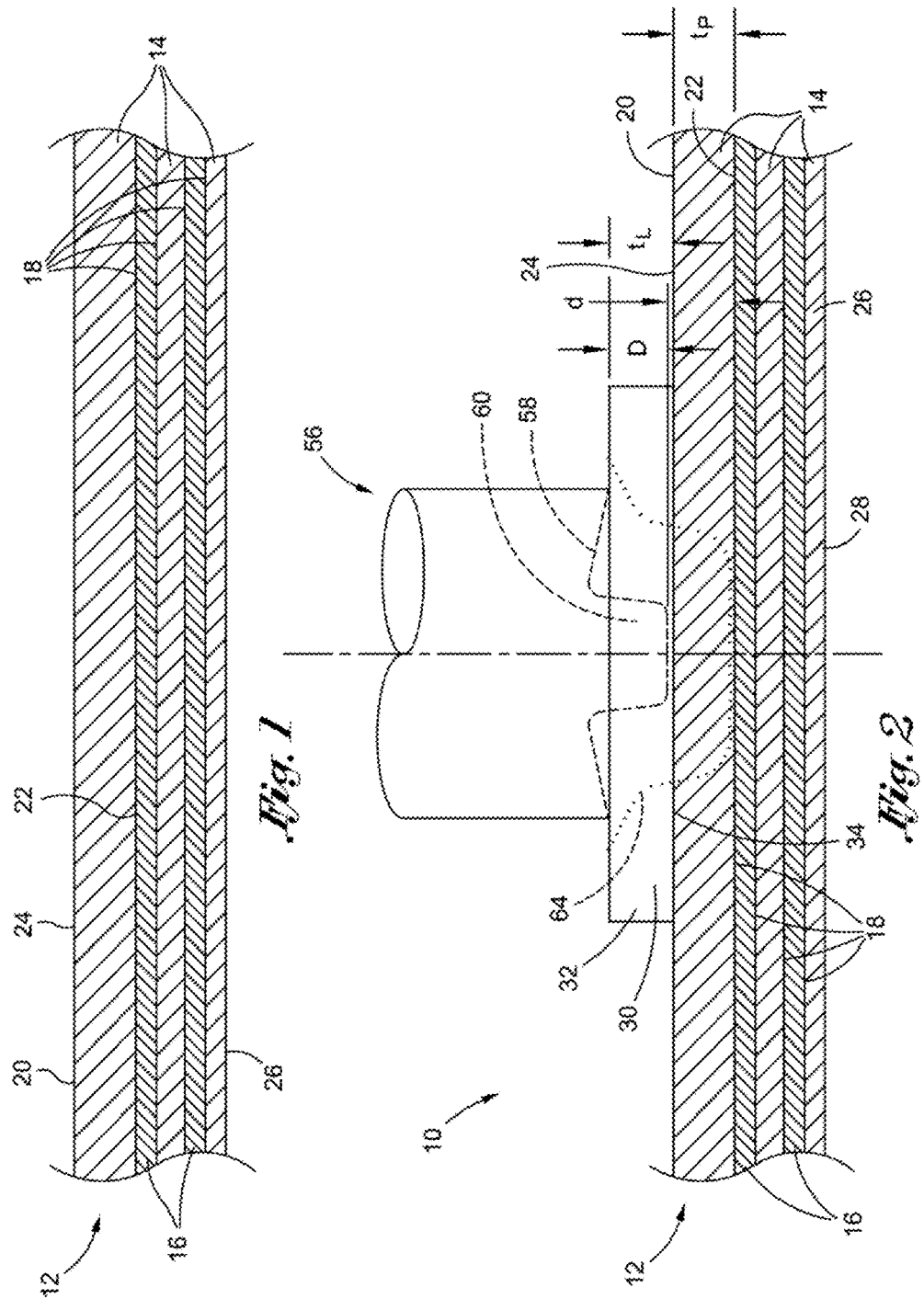

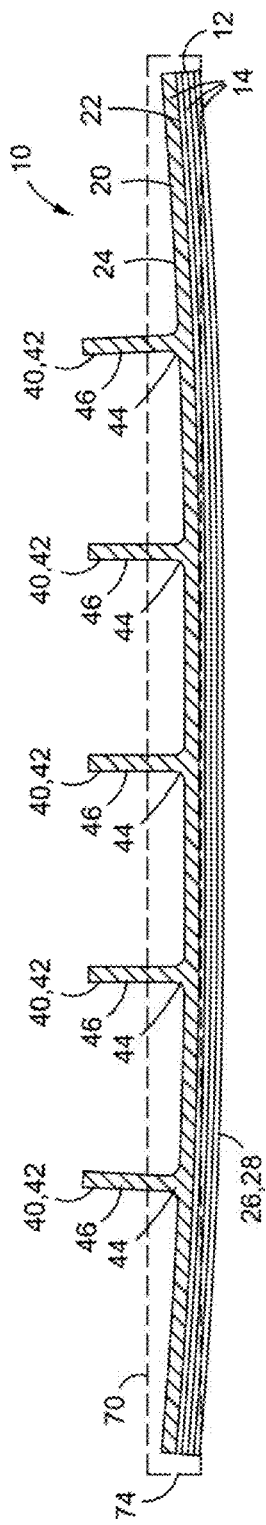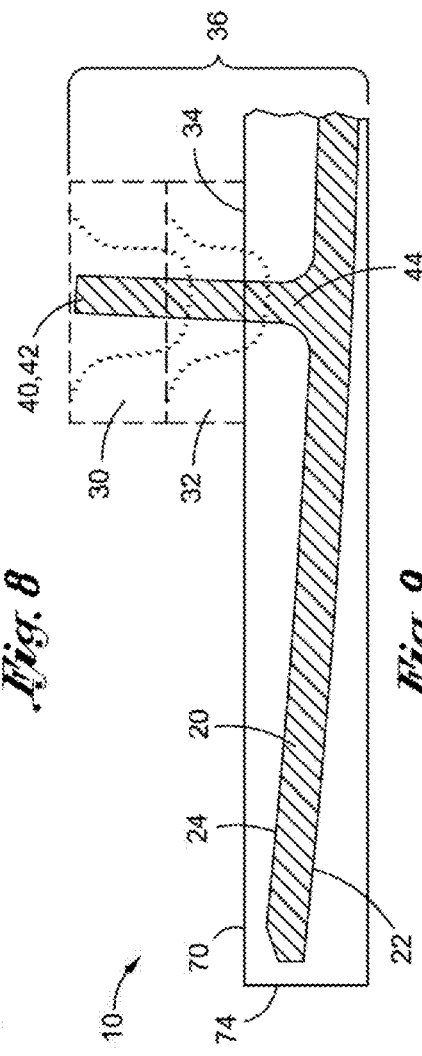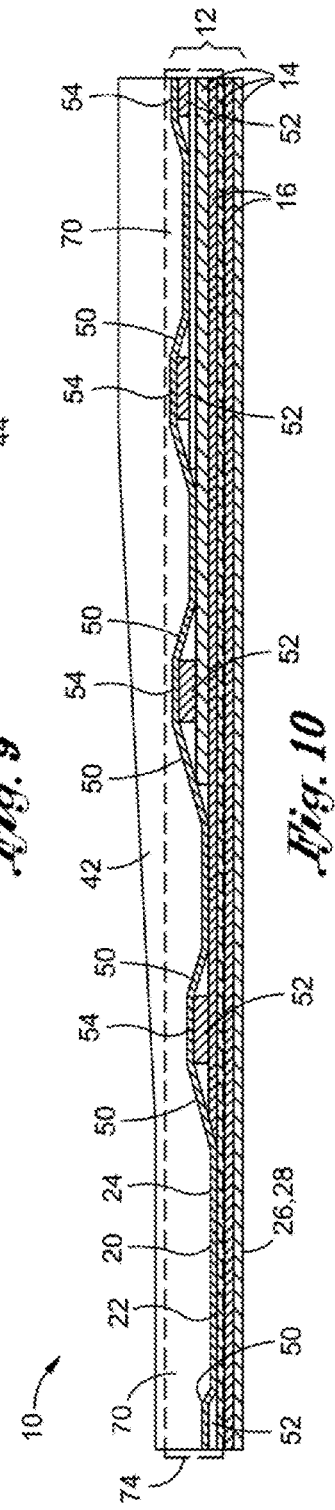

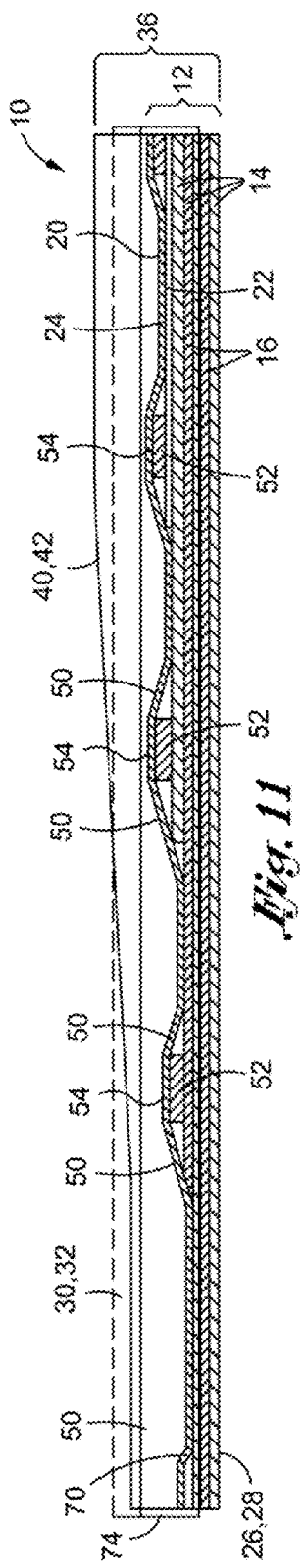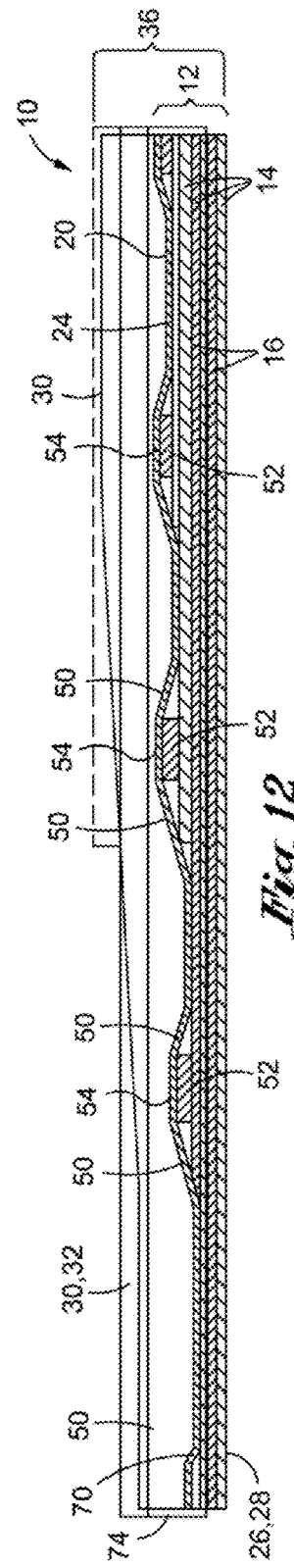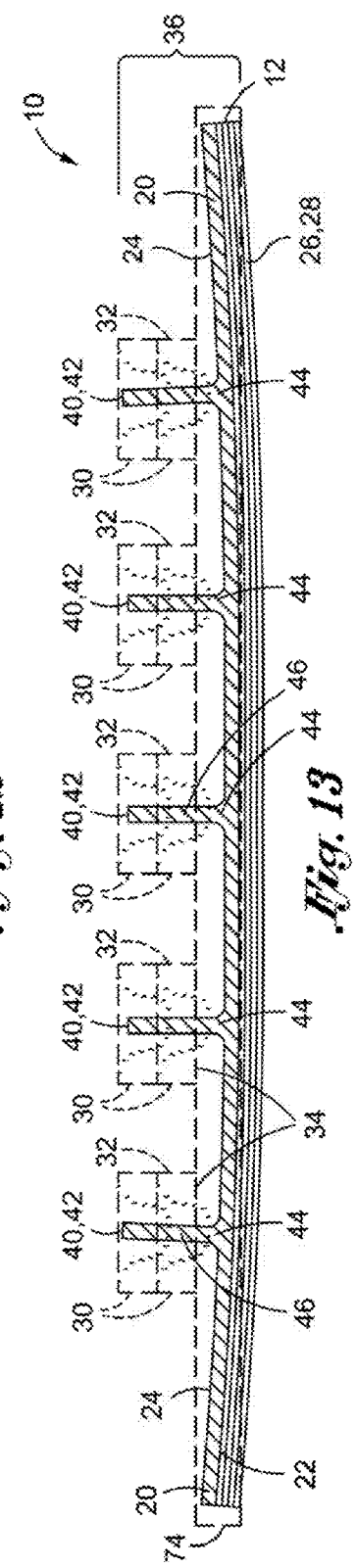

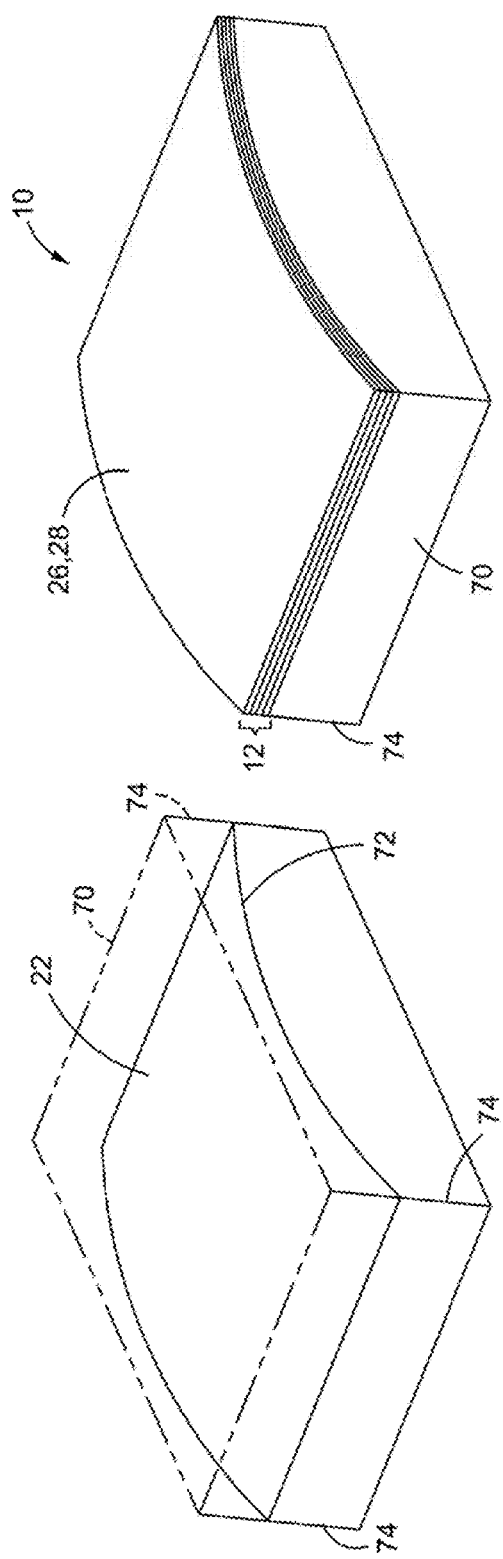
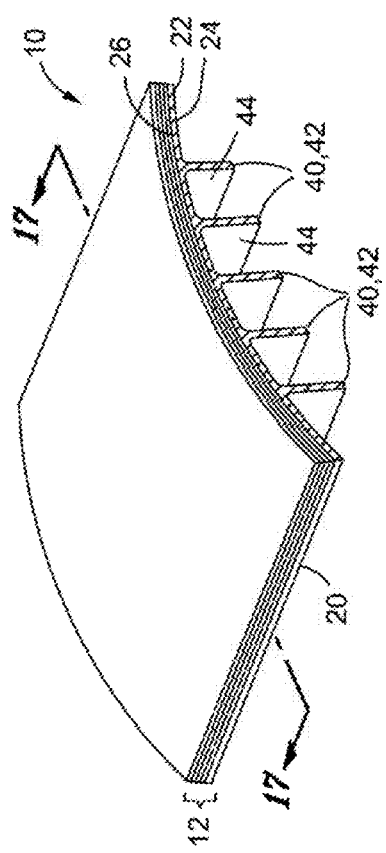

SYSTEM AND METHOD FOR INTEGRALLY FORMING A STIFFENER WITH A FIBER METAL LAMINATE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to fiber metal laminate structures and, more particularly, to a system and method for forming unitized fiber metal laminate skins with integral substructure elements such as stiffeners.

BACKGROUND

Many airframe structural assemblies such as an aircraft fuselage are commonly-fabricated using a technique known as semi-monocoque construction. In this construction technique, high strength materials such as aluminum alloys are used to form an outer skin. Various substructure elements such as stiffeners are attached to the outer skin. The outer skin is typically designed to carry tension loads while the stiffeners are typically designed to carry bending and compression loads. The combination of the outer skin and the attached stiffeners results in a high-strength, low-weight structure that is well-suited for use in aircraft and other vehicles.

Fiber metal laminates are increasingly employed in semi-monocoque construction as a substitute for monolithic or homogeneous metallic skins. Typically comprised of alternating layers of metallic plies bonded to composite or fiberglass plies, fiber metal laminates are typically lighter in weight than homogeneous metallic skins of comparable thickness. In addition, for comparable skin thicknesses, fiber metal laminates exhibit improved mechanical properties such as increased fatigue life relative to homogeneous metallic skins.

Despite the advantages provided by fiber metal laminate skins, it is typically necessary to employ stringers and/or stiffeners with the skin as a means for carrying the above-mentioned bending and compression loads. A common method for attaching stiffeners to skins is with mechanical fasteners such as rivets, hi-locks and various other fastening systems. In this regard, it is typically necessary to drill a large quantity of fastener holes through the skin and stiffeners in order to allow for installation of the mechanical fasteners.

For large aircraft, thousands of such fastener holes must typically be drilled and an equal number of fasteners must be installed in a time-consuming and labor-intensive process in order to attach the stiffeners to the skin. Although mechanical fastening of stiffeners to skins has been a satisfactory method for its intended purpose, such method presents certain drawbacks which, over time, can increase operating and maintenance costs and can reduce service life.

For example, it is well-known in the art that holes in a load-carrying member are typically locations of increased stress in the member. Particularly in primary load-carrying members of an aircraft such as the aircraft fuselage, skins are subjected to repeated applications of high operating loads which, in turn, results in the repeated concentration of localized stresses at the fastener holes. Over time, such localized stress concentrations may lead to the occurrence of undesirable effects in the skin. Although fiber metal laminate skins tend to limit the manifestation of such undesirable effects as compared to homogeneous metallic skins, such undesirable effects may nonetheless occur.

As can be seen, there exists a need in the art for a system and method for attaching substructure elements such as stiffeners to fiber metal laminate skins without the use of mechanical fasteners. Furthermore, there exists a need in the art for a system and method for joining substructure elements to a fiber metal laminate skin with reduced fabrication and assembly costs and in a reduced amount of time such that the extended fatigue life capabilities of fiber metal laminates can be employed to their full benefit.

The features, functions and advantages that have been discussed can be achieved independently in various embodiments of the present disclosure or may be combined in yet other embodiments, further details of which can be seen with reference to the following description and drawings below.

BRIEF SUMMARY

The above-described needs associated with fiber metal laminates and integrally-formed stiffeners are specifically addressed by the embodiments disclosed herein. More specifically, disclosed is a unitized assembly having at least one substructure element integrally formed therewith. The substructure element may take any size, shape, form or configuration including, without limitation, any stiffener, stringer, rib, and bracket configuration as well as various surface feature configurations.

In a broad sense, the unitized assembly comprises a fiber metal laminate having at least one additive layer deposited thereonto. The additive layer is preferably deposited by any suitable means such as by friction stir welding. As is well known, the fiber metal laminate may be comprised of metallic and non-metallic plies and having an innermost metallic ply. The metallic and non-metallic plies may be arranged in alternating relationship to one another although non-alternating arrangements are contemplated. The additive layer is preferably deposited onto the innermost metallic ply by friction stir welding in order to integrate the substructure element into the fiber metal laminate without the use of mechanical fasteners.

In one embodiment, the additive layer is preferably formed as an elongate strip of metallic material such as aluminum. The additive layer is preferably compatible with the material of the innermost metallic ply such that the additive layer may be integrated into the innermost metallic ply by friction welding. Additionally, the additive layer may comprise a plurality of additive layers and may include the first additive layer deposited onto the innermost metallic ply and successively-deposited additive layers also integrated thereinto to collectively form a friction welded preform.

The friction stir welded preform may be formed into its final configuration by any suitable means such as by machining the additive layers and/or the innermost metallic ply. The unitized assembly combines the advantages provided by fiber metal laminates with the advantages of semi-monocoque construction in order to extend the service life of a structural assembly as compared to structural assemblies comprised of stiffeners that are mechanically fastened to a homogeneous metallic skin.

Furthermore, the ability to integrate the stiffeners into fiber metal laminates provides an improvement in strength and weight as compared to structural assemblies using homogeneous metallic skins. The elimination of mechanical fasteners for attaching stiffeners to skins as used in conventional semi-monocoque construction allows for a reduction in stress concentrations in the skin that are otherwise created by the drilling of multiple fastener holes. In this regard, the unitized assembly in the various embodiments disclosed herein provides a low-cost and lightweight semi-monocoque structure having improved impact-resistance and resistance to crack formation as compared to conventional structures that are assembled using mechanical fastening and/or adhesive bonding.

A further advantage provided by the unitized assembly as disclosed herein is the ability to tailor the size and thickness of the fiber metal laminate in proportion to the various structural loads to which the fiber metal laminate may be subjected. In one embodiment, the fiber metal laminate skins may be fabricated with tapered thicknesses along a length thereof by dropping plies along a length of the fiber metal laminate skin during layup of the fiber metal laminate.

In one embodiment, the unitized assembly is formed by friction stir welding a first additive layer to an innermost metallic ply of the fiber metal laminate. The deposition of the first additive layer onto the innermost metallic ply may be facilitated using a rotating probe that may be driven along a length of the additive strip in order to mix and fuse the first additive layer to the innermost metallic ply in the weld zone. In this embodiment, the first additive layer is provided in a thickness that minimizes the introduction of excessive thermal loads into the fiber metal laminate.

As was indicated above, fiber metal laminates are typically comprised of fiberglass or other composite materials which are bonded to metallic plies using an adhesive having a temperature limit that is lower than that of the metallic plies. By limiting excessive heat (i.e., thermal loads) in the fiber metal laminate, the integrity of the adhesive and the non-metallic plies is preserved. In this regard, the innermost metallic ply in one embodiment is preferably maintained at a thickness that allows for the distribution of thermal loads in the fiber metal laminate. The thickness of the innermost metallic ply may be dependent in part upon the type of material from which the innermost metallic ply and the additive layer are fabricated and the type of material used in the adhesive system of the fiber metal laminate. The innermost metallic ply is also preferably sized and configured to allow for the generation of sufficient thermal energy to friction weld the first additive layer to the innermost metallic ply.

The additive layer may be initially disposed on the innermost metallic ply to form a lap joint at an interface between the additive layer and the innermost metallic ply. The friction stir welding operation may require orientation of the friction stir welding probe in a transverse direction relative to the interface. The friction stir welding probe is preferably extended at least partially through the additive layer to a depth sufficient to allow the generation of heat and urging sufficient material movement to cause welding of the components. Extension of the probe into the innermost metallic ply may not be necessary in order to weld the additive layer to the innermost metallic ply.

During the welding process, the rotating friction stir welding probe is driven along the first additive layer to form the weld joint which extends along a length of the additive layer. Force sensors and other control mechanisms may be employed in regulating the movement and orientation of the friction stir welding probe. Upon deposition of the first additive layer to the innermost metallic ply, additional additive layers may be successively deposited to form a friction stir welded preform comprised of the stack of additive layers and the innermost metallic ply and/or the fiber metal laminate. From the friction stir welded preform, the substructure elements may be machined.

In a further embodiment, the unitized assembly may be formed using a stock member such as a thin flat plate of metallic composition and from which the innermost metallic ply may be machined. In this regard, the stock member is preferably sized to encompass the inner and outer surfaces of the innermost metallic ply. Additive layers may be deposited onto the stock member in the appropriate locations and at an appropriate height sufficient to allow machining of the substructure elements into their final shape. An outer surface of the innermost metallic ply may also be machined into the friction stir welded preform at this point although any suitable mechanism and/or technique may be used to form the inner and outer surfaces of the innermost metallic ply and to form the substructure elements.

In one embodiment, the alternating metallic and non-metallic plies may be laid up on the machined outer surface of the innermost metallic ply. In this regard, the outer surface of the innermost metallic ply acts as a mold for the fiber metal laminate. However, in an alternative embodiment, the outer surface of the innermost metallic ply may be initially machined followed by laying up the fiber metal laminate over the outer surface. The substructure elements (i.e., stiffeners) and inner surface of the innermost metallic ply may then be machined. As may be appreciated, the sequence by which the outer and inner surfaces may be machined may be varied to suit the configuration of the unitized assembly.

In a further embodiment that may not include the use of friction stir welding, the unitized assembly may be fabricated starting with a stock member that may be sized to encompass the outer surface of the innermost metallic ply and the substructure elements. In this embodiment, the stock member may be machined to form the outer surface upon which alternating metallic and non-metallic plies may be laid to form the fiber metal laminate. The stock member may then be machined to form the inner surface of the innermost metallic ply and to form the substructure elements such as stiffeners, stringers and other features.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a cross-sectional illustration of a fiber metal laminate comprised of metallic and non-metallic plies and having an innermost metallic ply;

FIG. 2 is a cross-sectional illustration of the fiber metal laminate having a first additive layer disposed in abutting contact with the innermost metallic ply and being deposited thereto using friction stir welding;

FIG. 8 is a section cut of the unitized assembly taken along lines 8-8 of FIG. 7 and illustrating a curvature of the unitized assembly;

FIG. 9 is an enlarged sectional illustration of a stock member (e.g., thin plate) having additive layers deposited thereonto using friction stir welding;

FIG. 10 is a section cut taken of the unitized assembly taken along lines 10-10 of FIG. 7 and illustrating a variation in a thickness of the fiber metal laminate as well as a variation in a thickness of the substructure elements (i.e., stiffeners);

FIG. 11 is a sectional illustration of the stock member superimposed on the unitized assembly and illustrating a first additive layer deposited onto the stock member;

FIG. 12 is a section view of the stock member having a further additive layer superimposed onto the first additive layer to accommodate an increased height of the substructure element (i.e., stiffener);

FIG. 13 is a section cut taken of the unitized assembly in an orientation similar to that shown in FIG. 8 and illustrating a plurality of additive layers deposited onto the stock member to form the friction stir welded preform;

FIG. 14 is a perspective illustration of the stock member from which an outer surface of the innermost metallic ply may be formed such as by machining, casting, forging, direct metal deposition, or other forming processes;

FIG. 15 is a perspective illustration of the alternating metallic and non-metallic plies which may be laid over the outer surface of the innermost metallic ply;

FIG. 16 is a perspective illustration of the substructure elements (i.e., stiffeners) machined into the stock member;

DETAILED DESCRIPTION

Figure 3:
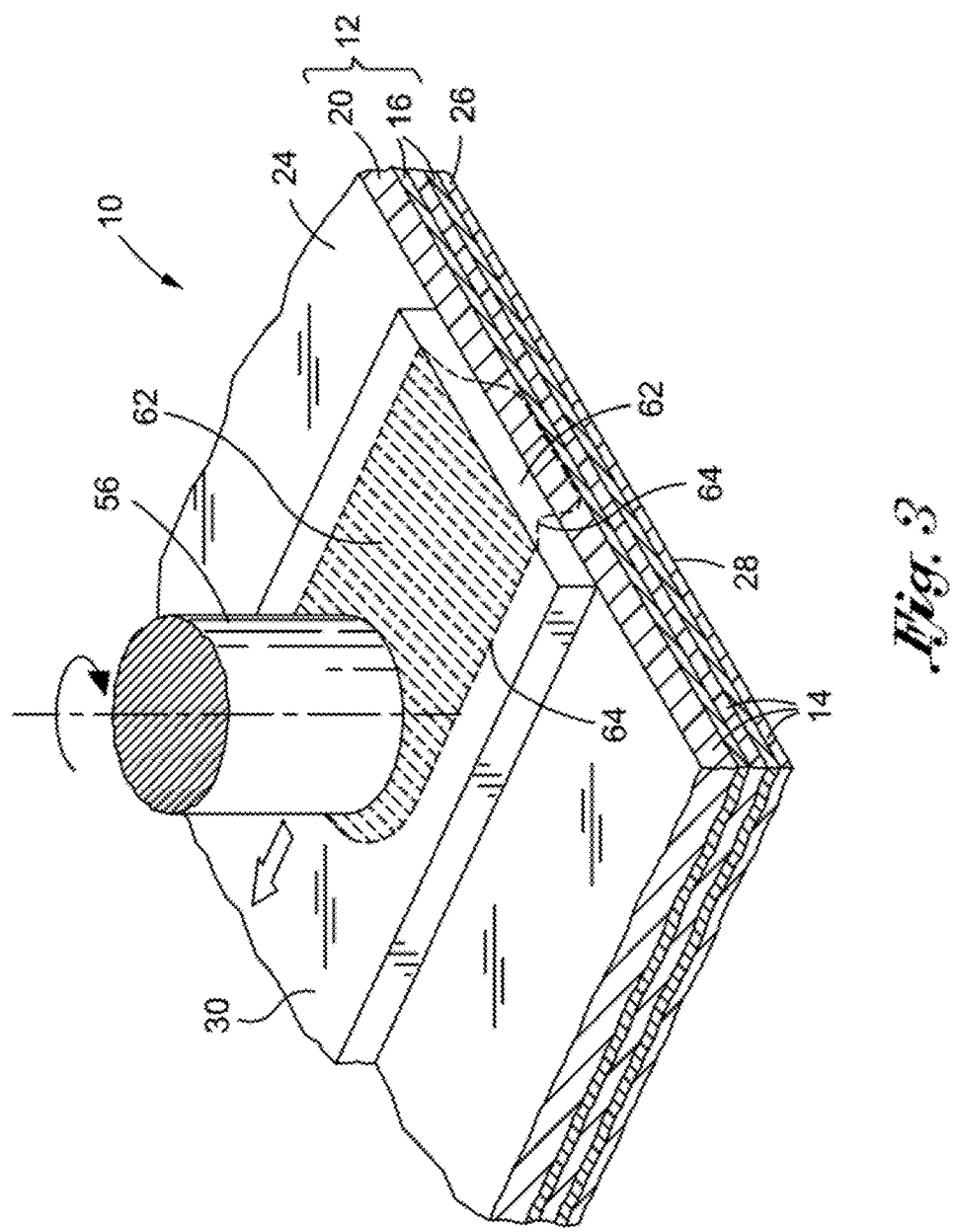
FIG. 3 is a perspective illustration of the fiber metal laminate and first additive layer during the deposition process using a rotating probe driven along the first additive layer to form a weld joint.

Referring now to the drawings wherein the showings are for purposes of illustrating preferred and various embodiments of the disclosure only and not for purposes of limiting the same, shown in FIGS. 1-20 is a system and method for fabricating a unitized assembly 10 comprising a fiber metal laminate 12 and an integrally formed substructure element 40. In one embodiment, the unitized assembly 10 may be fabricated by depositing at least one or, more preferably, a plurality of additive layers 30 such as metallic strips onto the fiber metal laminate 12.

In the embodiments illustrated in FIGS. 1-13, the additive layers 30 may be deposited onto the fiber metal laminate 12 using friction stir welding to create a friction stir welded preform 36. Substructure elements 40 such as stiffeners 42 may be machined into the friction stir welded preform 36 to create the unitized assembly 10. In an alternative embodiment illustrated in FIGS. 14-17, a stock member 70 such as a metal plate may be machined to form an innermost metallic ply 20 over which metallic and non-metallic plies 14, 16 may be laid to form the fiber metal laminate 12. Although alternating arrangements of the metallic and non-metallic plies 14, 16 are preferred, the metallic and non-metallic plies 14, 16 may be arranged in non-alternating arrangements or in combinations of alternating plies and non-alternating plies. The substructure elements 40 may be machined into the stock member 70 (e.g., metal plate) opposite the fiber metal laminate 12 to create the unitized assembly 10.

The technical effects of the disclosed embodiments include a reduction in cost and time required to fabricate a unitized, tailored fiber metal laminate 12 having substructure elements 40 such as stiffeners 42 and stringers integrally formed therewith. As such, the disclosed embodiments provide a system and method for integrally forming substructure elements 40 with fiber metal laminate 12 skins without the use of mechanical fasteners to attach the substructure elements (e.g., stiffeners) and thereby eliminating the need to drill multiple fastener holes through the skin and stiffener. Additional advantages provided by the disclosed embodiments include an increase in strength and fatigue life as compared to conventional semi-monocoque assemblies having stiffeners attached to a skin.

Referring particularly now to FIGS. 1-6, shown is the unitized assembly 10 in one embodiment wherein the unitized assembly 10 comprises a fiber metal laminate 12 skin having one or more additive layers 30 deposited onto the innermost metallic ply 20 by fiction stir welding. As can be seen in FIG. 1, the fiber metal laminate 12 is typically comprised of alternating metallic and non-metallic plies 14, 16 that are bonded together using an adhesive 18. As shown, the innermost metallic ply 20 is disposed adjacent the additive layers 30. The fiber metal laminate 12 includes an outermost ply 26 which forms the outer skin surface 28. The additive layers 30 are preferably fabricated of metallic material that is compatible with the innermost metallic ply 20 of the fiber metal laminate 12. In order to facilitate friction stir welding of the additive layer 30 to the innermost metallic ply 20, the innermost metallic ply 20 preferably has a thickness which is greater than the thickness of the metallic plies 14 that make up the remainder of the fiber metal laminate 12.

As can be seen in FIG. 1, the fiber metal laminate 12 has a thickness which is illustrated for exemplary purposes only as being approximately twice the thickness of the metallic plies 14. The fiber metal laminate 12 may be fabricated by methods well-known in the art and wherein the metallic and non-metallic plies 14, 16 are bonded using known adhesives 18 such as epoxy. The metallic plies 14 may be fabricated of any suitable material including, but not limited to, aluminum, titanium and other high strength alloys. The non-metallic plies 14 may be fabricated of any suitable material including, but not limited to, fiberglass, carbon fiber and other semi-metallic and/or non-metallic materials that are compatible with the adhesive 18 and with the metallic plies 14. The fiber metal laminate 12 is preferably fabricated to provide superior fatigue resistance and impact resistance as compared to conventional homogeneous metallic skins.

Referring to FIG. 2, shown is a sectional illustration of a first additive layer 32 positioned over the inner surface 24 of the innermost metallic ply 20. The first additive layer 32 is preferably sized and configured to facilitate the generation of sufficient thermal energy during the friction stir welding process to allow deposition of the first additive layer 32 onto the innermost metallic ply 20. As can be seen in FIG. 2, the first additive layer 32 may be joined or integrated into the innermost metallic ply 20 using friction stir welding wherein the probe 56 is preferably oriented transversely relative to an interface 34 between the first additive layer 32 and the innermost metallic ply 20.

The probe 56 shoulder 58 may be disposed in contacting relation to the first additive layer 32 and preferably extends into at least a depth "D" of the first additive layer 32 although the probe 56 may extend completely through a thickness "$t_L$" of the first additive layer 32 and at least partially into the innermost metallic ply 20 depending upon the materials and the various parameters of the friction stir welding process. In this regard, the innermost metallic ply 20 and the first additive layer 32 are each sized and configured to facilitate the generation of thermal energy sufficient to deposit or integrate the first additive layer 32 into the innermost metallic ply 20.

For example, in one embodiment of the unitized assembly 10 wherein the additive layer 30 and the innermost metallic ply 20 are formed of aluminum alloy materials, the innermost metallic ply 20 preferably has a thickness "$t_P$" (e.g., 0.012 inches, 0.030 inches, 0.060 inches, etc.) that allows for adequate distribution of thermal energy generated during the friction stir welding process. The probe 56 may be controlled in such a manner as to regulate the distance "d" from the probe tip 60 to the outer surface 22 (i.e., the backside) of the innermost metallic ply 20. The distance "d" of the probe tip 60 may have an effect on the size of the weld zone or nugget 64 illustrated in FIG. 2. It is not necessary that the probe tip 60 extends into the innermost metallic ply 20 in order to weld the additive layer 30 to the innermost metallic ply 20 as the heat and material movement in the additive layer 30 may be sufficient to effectively join the two components.

Referring to FIG. 3, shown is a perspective illustration of the fiber metal laminate 12 with the first additive layer 32 positioned on the innermost metallic ply 20. The probe 56 is shown as being driven along a length of the additive layer 30. The cross-hatched area in FIG. 3 illustrates the location of the weld joint 62 created by driving the probe 56 along the length of the additive layer 30. As was earlier indicated, the first additive layer 32 is preferably sized and configured to minimize thermal loads or heat in the innermost metallic ply 20 during deposition of the first additive layer 32. It should also be noted that the additive layers 30 are not limited to deposition by friction stir welding but may be integrated into the innermost metallic ply 20 by a variety of alternative means including, but not limited to, linear friction welding, inertia welding, and a variety of conventional welding methods including arc welding, gas welding, laser welding, ultrasonic welding and any other welding or joining processes.

Furthermore and referring to FIGS. 2-3, although the probe 56 is illustrated as being oriented transversely (i.e., perpendicularly) relative to the lap joint defined at the interface 34 between the first additive layer 32 and the innermost metallic ply 20, it is contemplated that the probe 56 may be oriented in alternative arrangements. For example, it is contemplated that the probe 56 may be oriented in a manner required for the formation of butt joints between adjoining metallic components. In this regard, the probe 56 may be aligned with the interface 34 between the first additive layer 32 and the innermost metallic ply 20.

Figure 4:
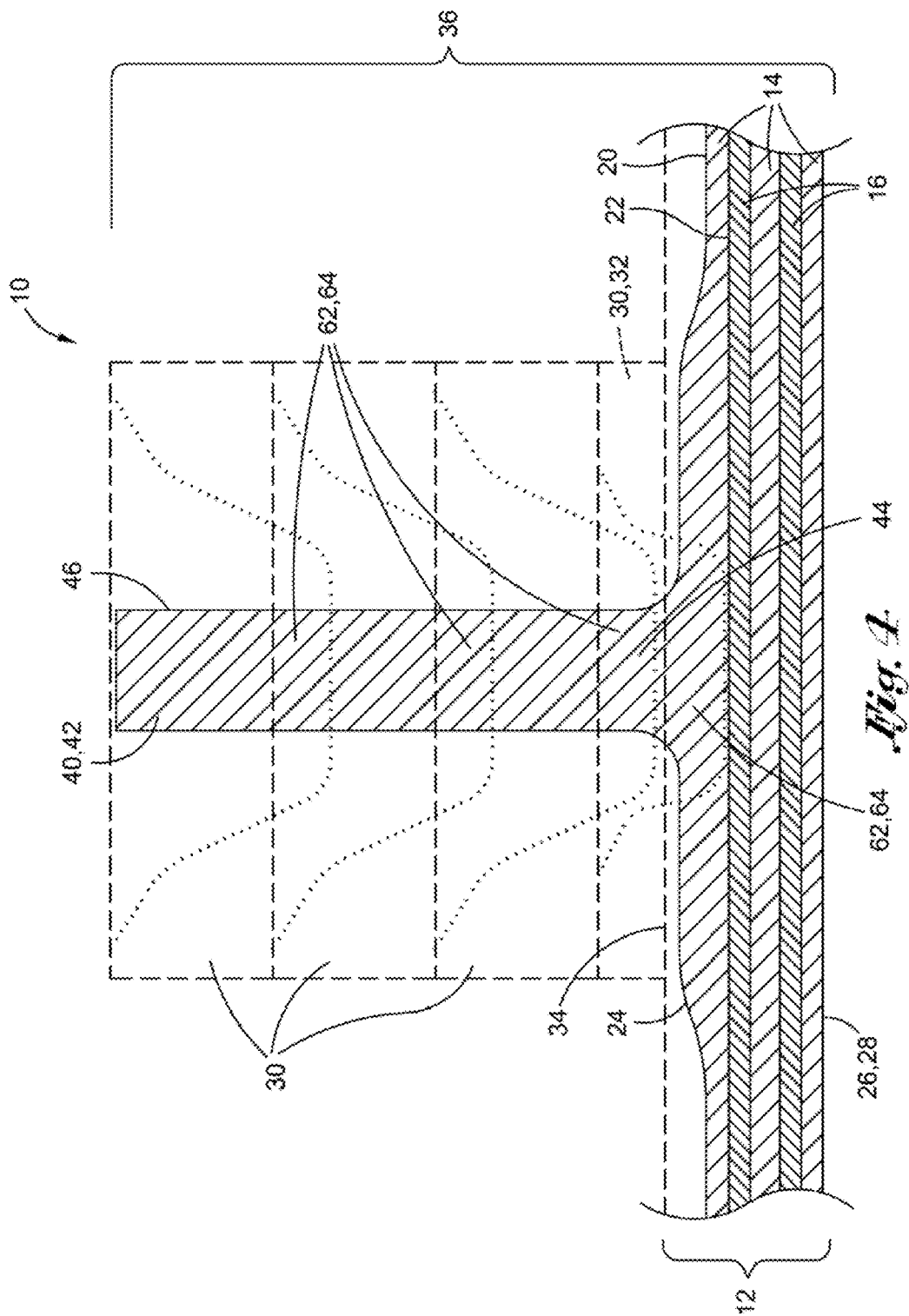
FIG. 4 is a cross-sectional illustration of the fiber metal laminate and a plurality of additive layers successively deposited thereonto by friction stir welding.

Referring to FIG. 4, shown is a cross-section of the unitized assembly 10 illustrating a plurality of additive layers 30 which have been successively deposited onto previously added additive layers 30 to form the friction stir welded preform 36. The friction stir welded preform 36 may comprise the fiber metal laminate 12 and one or more of the additive layers 30. For the illustration shown in FIG. 4, the friction stir welded preform 36 comprises the fiber metal laminate 12 and the remaining three additive layers 30 successively deposited thereon. As can be seen, the first additive layer 32 has a thickness which is preferably, but optionally, less than the thickness of the successively applied additive layers 30. Once the first additive layer 32 is deposited onto the innermost metallic ply 20, the process is repeated with successive deposition of additive layers 30 until a desired height or thickness of the friction stir welded preform 36 is achieved.

In this regard, FIG. 4 illustrates a vertical web 46 configuration of a substructure element 40 that has been integrated into the innermost metallic ply 20. The additive layers 30 are formed at a height which is slightly greater than the overall height of the stiffener 42 (i.e., substructure element). The weld joint 62 between the first additive layer 32 and the innermost metallic ply 20 can be seen in the dotted line which indicates the boundary of a nugget 64 that is created during the friction stir welding process. In this regard, the interface 34 between each of the additive layers 30 results in the formation of the nugget 64 representing that portion of material which is effectively joined together. Ideally, the nugget 64 extends across a width or thickness of the vertical web 46 in order to ensure consistent mechanical properties within the substructure element including in a base portion 44 of the vertical web 46. It can also be seen that the boundary of the nugget 64 located between the three upper additive layers 30 is larger in size than the boundary of the nugget 64 between the first additive layer 32 and the innermost metallic ply 20. In this regard, the size of the nugget 64 may be proportional to the size of the probe 56 such that a smaller probe 56 generates a smaller nugget 64 with a narrower cross-section as compared to a larger probe 56 which may generate a relatively larger nugget 64.

Figure 5:
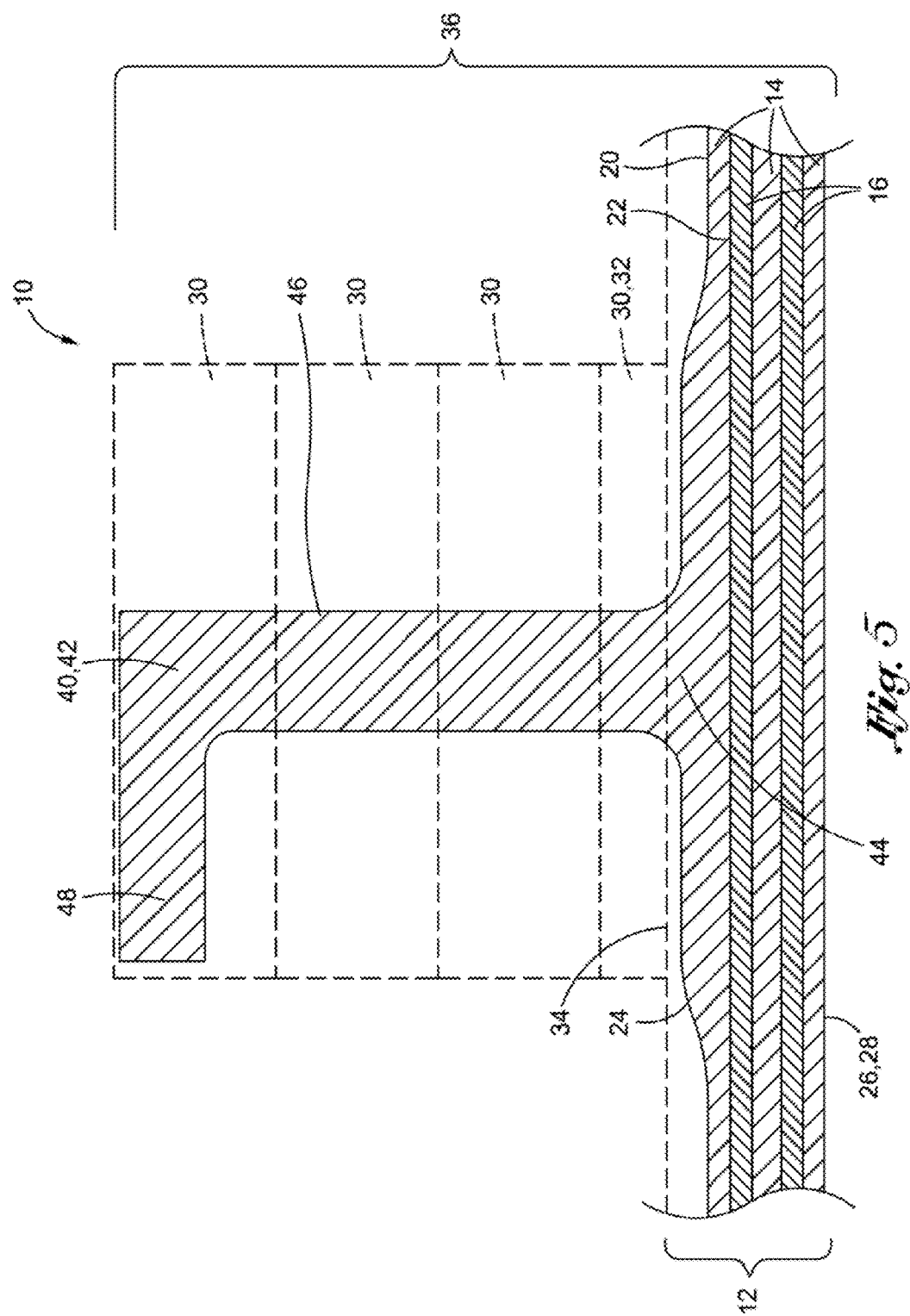
FIG. 5 is a cross-sectional illustration of a unitized assembly comprising the innermost metallic ply and the additive layers machined into a "J" configuration.
Figure 6:
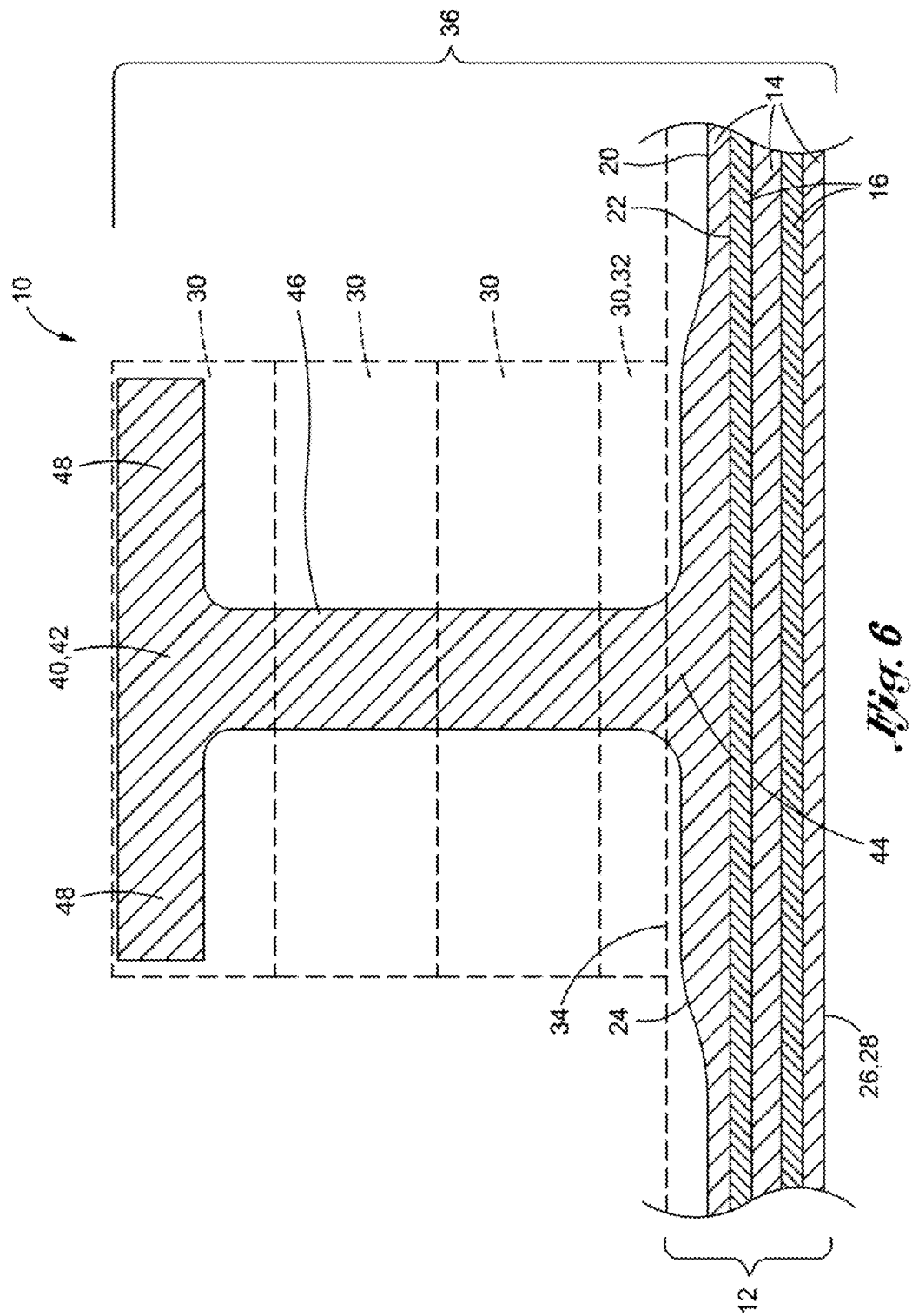
FIG. 6 is a cross-sectional illustration of the unitized assembly wherein the innermost metallic ply and the additive layers are machined into an "I" configuration.

Referring to FIGS. 5 and 6, shown is a cross-section of the unitized assembly 10 illustrating alternative arrangements of the substructure element 40. For example, FIG. 5 illustrates the substructure element 40 comprised of the vertical web 46 having a laterally extending flange 48 and forming an inverted "J" shape. In contrast, FIG. 6 illustrates a cross-section of a unitized assembly 10 in an embodiment wherein the substructure element 40 includes opposing flanges 48 extending laterally outwardly from the vertical web 46 to form an "I" shape. FIG. 6 illustrates the additive layers 30 which are shown superimposed over the respective sections of FIGS. 5 and 6. As can be seen, the system and method for integrally forming the substructure element 40 with the fiber metal laminate 12 permits a wide variety of cross-sectional shapes by varying the size and quantity of the additive layers 30.

Although the embodiments illustrated in FIGS. 1-6 show a single substructure element 40 such as the vertical web 46 with outwardly extending flanges 48, it should be noted that the system and method as disclosed herein may be employed for generating unitized assemblies having a plurality of substructure elements 40 such as stiffeners 42 extending upwardly from the innermost metallic ply 20. Advantageously, the embodiments disclosed in FIGS. 1-6 illustrate that a wide variety of cross-sectional shapes may be formed with the fiber metal laminate 12 and which may be used in a wide variety of industries including, but not limited to, aerospace, automotive, marine and other industries wherein lightweight, cost-effective and impact-resistant structures with extended fatigue life are desired. Furthermore, the unitized assembly 10 may be used to form a wide variety of different structures for different applications including, but not limited to, structural components for aircraft such as wing ribs wherein multiple stiffeners 42 or stringers are required. The stiffeners 42 or stringers may be formed in a wide variety of cross-sectional shapes such as may be used for stiffening a wing rib.

Figure 18:
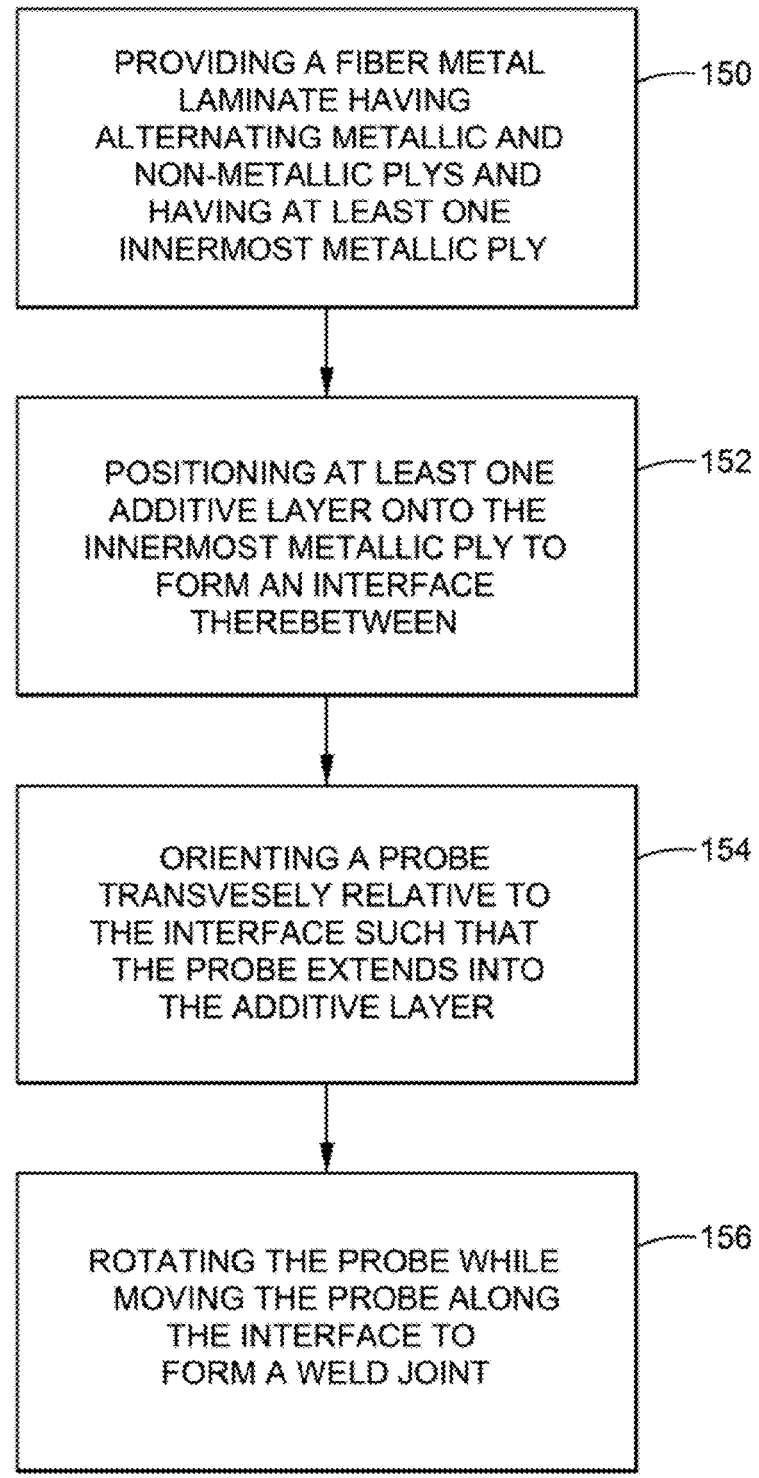
FIG. 18 is a flow chart illustrating a methodology of forming a unitized assembly in one embodiment.

Referring briefly to FIG. 18, shown is a methodology for forming the unitized assembly 10 illustrated in FIGS. 1-6. In one embodiment, step 150 of the method may comprise providing the fiber metal laminate 12 with alternating metallic and non-metallic plies 14, 16 and having at least one innermost metallic ply 20 as illustrated in FIGS. 1-2. Step 152 may further comprise depositing at least one additive layer 30 such as the first additive layer 32 onto the innermost metallic ply 20 such as by friction stir welding in order to form the friction stir welded preform 36. The fiber metal laminate 12 may be formed by processes known in the art including providing a mold 72 surface over which the innermost metallic ply 20 and/or outermost ply 26 may be initially disposed.

The fiber metal laminate 12 as shown in FIGS. 1-6 may be formed by bonding alternating metallic and non-metallic plies 14, 16 using an adhesive 18. As was earlier indicated, such metallic plies 14 may be formed of any suitable metallic material including, but not limited to, aluminum and titanium materials. The non-metallic plies 14 may be fabricated of any suitable semi-metallic or non-metallic material including, but not limited to, fiberglass material. The innermost metallic ply 20 is preferably sized to have a thickness that allows for adequate distribution of thermal energy generated during the friction stir welding process. In this regard, by increasing the thickness of the innermost metallic ply 20 relative to the thicknesses of the remaining metallic plies 14 in the fiber metal laminate 12, damage due to excessive temperature in the remainder of the fiber metal laminate 12 may be avoided.

Once the fiber metal laminate 12 is bonded together, the innermost metallic ply 20 may be clamped in place using hard tooling to prevent movement thereof Referring to FIGS. 2-3, step 154 of the method may comprise orientating the probe 56 transversely relative to the interface 34 between the innermost metallic ply 20 and the additive layer. As can be seen in FIG. 2, the probe 56 preferably extends into the additive layer 30 and may optionally extend completely through the additive layer 30 and at least partially into the innermost metallic ply 20. In step 156, the probe 56 is rotatably driven along the interface 34 (i.e., along the direction of the additive layer) in order to form the weld joint 62 as illustrated in FIG. 3. Additive layers 30 may be successively deposited onto the first additive layer 32 using the same process described above until the desired thickness of the friction stir welding preform 36 is achieved.

Referring to FIGS. 4-6, the method may further comprise the step of machining the friction stir welded preform 36 in order to form the inner surface 24 of the innermost metallic ply 20. As can be seen in FIG. 4, the surface of the innermost metallic ply 20 may include a step wherein the innermost metallic ply 20 has a local increase in thickness in the area adjacent the vertical web 46 with decreasing or tapering thickness as the innermost metallic ply 20 extends outwardly away from the vertical web. The method may further comprise machining the friction stir welded preform 36 in order to form the substructure element 40 which, in the embodiments illustrated, may comprise the stiffener 42 having the vertical web 46. However, the friction stir welded preform 36 may be formed in alternative shapes, sizes, configurations as well as surface features such as bosses and other features that may facilitate attachment of various system brackets and hardware.

It should also be noted that the methodology for forming the unitized assembly 10 illustrated in FIGS. 1-6 may be performed in a variety of different sequences. For example, it is contemplated that the deposition of the first additive layer 32 to the innermost metallic ply 20 may occur prior to laying up of the alternating metallic and non-metallic plies 14, 16 that comprise the fiber metal laminate 12. In this regard, the method may comprise the step of initially positioning and securing the innermost metallic ply 20 on a non-movable assembly fixture followed by positioning of the first additive layer 32 thereupon. The first additive layer 32 may comprise an elongate metallic strip sized and configured to be disposed along the innermost metallic ply 20. The friction stir welded preform 36 may be generated by depositing the first additive layer 32 onto the innermost metallic ply 20 in a manner similar to that which is illustrated in FIG. 3 but wherein the remaining metallic and non-metallic plies 14, 16 of the fiber metal laminate 12 are not yet installed. Additionally-deposited additive layers 30 may be successively applied using the friction stir welding process to achieve a desired height of the friction stir welded preform 36 as illustrated in FIG. 4. The fiber metal laminate 12 may be laid up by bonding alternating metallic and non-metallic plies 14, 16 either before or after the machining of the friction stir welding preform 36.

Referring now to FIGS. 7-13, shown is the unitized assembly 10 in a further embodiment comprising the fiber metal laminate 12 having a plurality of substructure elements 40 integrally deposited therewith using friction stir welding. However, the embodiment illustrated in FIGS. 7-13 may include the ability to fabricate the unitized assembly 10 through the use of a stock member 70 such as plate stock onto which the additive layers 30 may be deposited. The stock member 70 may be provided in any suitable configuration such as plate stock, bar stock, forgings, castings or any other configuration. Advantageously, the unitized assembly 10 illustrated in FIGS. 6-13 provides a further capability of tailoring the thickness of the fiber metal laminate 12 through the use of tapered plies. In addition, the unitized assembly 10 illustrated in FIGS. 6-13 provides the capability for forming locally thickened areas as may be required for strength or stiffness purposes.

Figure 7:
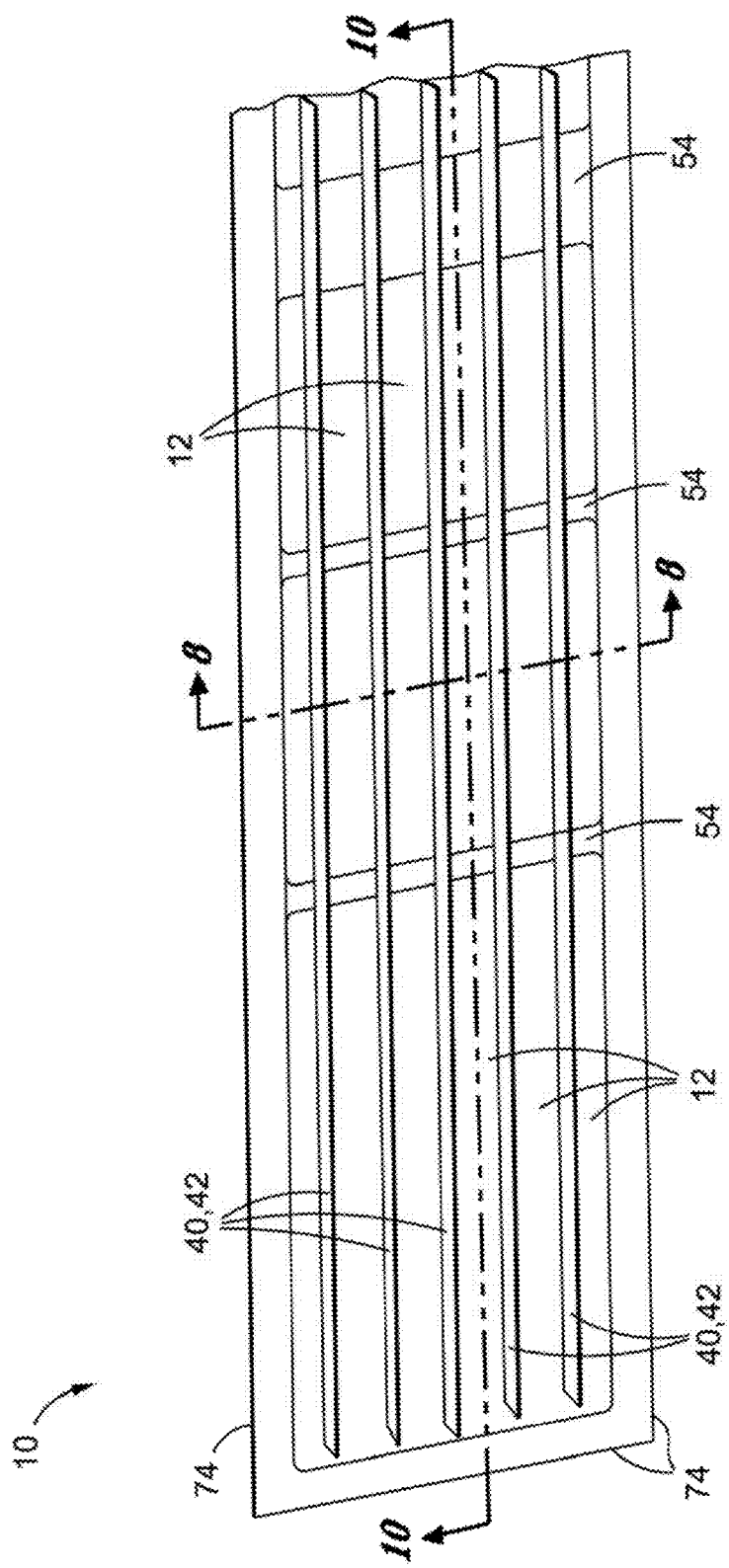
FIG. 7 is a perspective illustration of a unitized assembly comprising the fiber metal laminate having substructure elements (i.e., stiffeners) integrally formed therewith.
Figure 17:
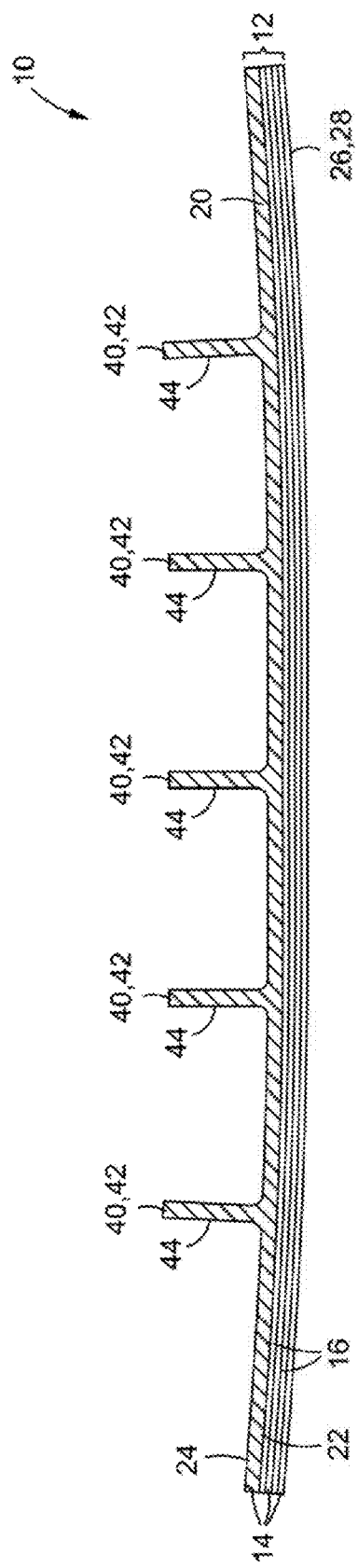
FIG. 17 is a cross-sectional illustration taken along lines 17-17 of FIG. 16 and illustrating the unitized assembly comprising the fiber metal laminate and the stiffeners integrally formed therewith.

In FIG. 7, the unitized assembly 10 may be formed with different thicknesses in the fiber metal laminate 12 portion. For example, the unitized assembly 10 may include a relatively thin portion of the fiber metal laminate 12 on a left side of the unitized assembly 10 and becoming progressively thicker moving toward a right side of the unitized assembly 10. In addition, FIG. 7 illustrates locally thickened areas 54 of the unitized assembly 10 which are indicated as vertical bands integrated into the fiber metal laminate 12 and which are best seen in the cross-sectional illustrations of FIGS. 10-12 and described below.

Referring to FIG. 8, shown is a cross-section taken along lines 8-8 of FIG. 7 and illustrating a curvature that may be formed in the fiber metal laminate 12 skin. Also shown in FIG. 8 are a plurality of the substructure elements 40 configured as blade stiffeners 42 extending upwardly from the fiber metal laminate 12. Superimposed over the cross-sectional illustration of the unitized assembly 10 of FIG. 8 is the stock member 70 (e.g., plate stock) from which the innermost metallic ply 20 may be formed. Ideally, the stock member 70 or plate is preferably sized and configured to encompass the innermost metallic ply 20 in its final machined shape. More specifically, the stock member 70 is preferably sized and configured such that the inner surface 24 and outer surface 22 of the innermost metallic ply 20 are completely encompassed. In this regard, it may be necessary to determine the minimum raw material size of the stock member 70 prior to machining the innermost metallic ply 20. The additive layers 30 may be deposited to the innermost metallic ply 20 after which the outer surface 22 may be formed and the fiber metal laminate 12 laid thereover or the inner surface 24 and substructure elements 40 may be machined prior to machining the outer surface 22 and laying up the fiber metal laminate 12.

Referring briefly to FIG. 10, shown is a sectional illustration of the unitized assembly 10 taken along lines 10-10 of FIG. 7 and illustrating the stock member 70 superimposed over a longitudinal section cut of the unitized assembly 10. FIG. 7 further illustrates the tapered configuration of the fiber metal laminate 12 and, more particularly, the tapered configuration of the innermost metallic ply 20 of the fiber metal laminate 12. Furthermore, FIG. 10 illustrates a plurality of thickened areas 54 of the fiber metal laminate 12 created by the addition of thickening strips 52 in each one of the thickened areas 54. In this regard, each one of the thickening strips 52 may be configured as a metallic elongate strip extending or oriented perpendicularly relative to the orientation of the stiffeners 42. The location of the thickening strips 52 illustrated in FIG. 10 may correspond to the thickened areas 54 illustrated in FIG. 7.

In order to accommodate the tapered configuration of the innermost metallic ply 20 as well as accommodate the thickening strips 52 illustrated in FIG. 10, it may be necessary to size the innermost metallic ply 20 such that the inner and outer surfaces 24, 22 of the innermost metallic ply 20 are accommodated in both longitudinal and lateral directions as illustrated respectively by FIGS. 10 and 8. Upon determination of the minimum size of the stock member 70 sufficient to encompass the boundaries of the inner and outer surfaces 24, 22, additive layers 30 may be deposited onto the innermost metallic ply 20 in the locations illustrated. In order to deposit the first additive layer 32 to the innermost metallic ply 20, the probe 56 is rotatably driven along the additive layer 30 in order to create the weld zone or nugget 64 wherein the additive layer 30 is integrated with the innermost metallic ply 20.

As can be seen in FIG. 9-13, the additive layers 30 are successively deposited on previously deposited additive layers 30. In order to accommodate the taper in the substructure element 40 as illustrated in FIGS. 10-12, the additive layers 30 themselves may be tapered or stepped to accommodate the final shape of the substructure element 40. More specifically, the size of the additive layers 30 is dependent upon the height and width of the final shape of the substructure element 40 as well as dependent upon the width of the cross-section of the friction stir welded joint. In this regard and with reference to FIG. 9, the probe 56 is preferably sized in such manner as to generate a nugget 64 which facilitates joining of the thicker additive layers 30 to one another and to the innermost metallic ply 20.

FIG. 13 illustrates a cross-section of the stock member 70 having the additive layers 30 deposited thereon at locations complementary to the location of the substructure elements 40. Once the additive layers 30 are successively deposited onto the stock member 70 to create the friction stir welded preform 36, the inner surface 24 and outer surface 22 of the innermost metallic ply 20 may be machined to generate the desired cross-section illustrated in FIGS. 8-12. The inner and outer surfaces 24, 22 may include features such as joggles 50 in the innermost metallic ply 20 for accommodating thickening strips 52 illustrated in FIGS. 10-12. Furthermore, the innermost metallic ply 20 is preferably machined to accommodate the tapered thickness of the fiber metal laminate 12. For example, the metallic and non-metallic plies 14, 16 are successively dropped as the fiber metal laminate 12 tapers from a thicker cross-section illustrated on the right side of FIG. 10 to a thinner cross-section illustrated on the left side of FIG. 10.

Although the innermost metallic ply 20 illustrates a taper in each joggle 50 adjacent each of the thickening strips 52, it is contemplated that such joggles 50 may be formed as 90° bends such that the innermost metallic ply 20 closely conforms to the shape of the thickening strip 52 cross-section. In this regard, FIG. 10 illustrates the thickening strip 52 having a rectangular cross-sectional shape to conform to the side walls of the thickening strips 52. Alternatively, the thickening strips 52 may have an alternative shape such as a trapezoidal shape wherein the tapered sides of the innermost metallic ply 20 are formed complementary to the trapezoidal shape of the thickening strip 52 in order to minimize or eliminate the formation of gaps between the thickening strip 52 and the outer surface 22 at the joggles 50.

It is contemplated that the friction stir welded preform 36 may be machined using a "picture framing" method where excess material is provided around a perimeter 74 edge of the stock member 70 (i.e., plate stock) in order to facilitate clamping and securing of the stock member 70 during milling or machining. In addition, it is contemplated that the machining of the friction stir welded preform 36 may be preferably performed using low cutting forces as is typical for high speed machining operations to minimize lateral forces on the stock member during the machining process.

Upon formation of at least the outer surface 22 of innermost metallic ply 20, the fiber metal laminate 12 may be laid up using metallic and non-metallic plies 14, 16 as illustrated in FIGS. 10-12 in either an alternating and/or non-alternating arrangement. The plies may be laid up to accommodate changes in thickness of the fiber metal laminate 12 and to accommodate the thickening strips 52 which may be bonded in place and allowed to cure. Advantageously, the unitized assembly 10 illustrated in FIGS. 7-13 facilitates the formation of the fiber metal laminate 12 with tapered skin thicknesses and wherein a variety of different cross-sections in the substructure elements 40 (i.e., stiffeners 42) may be readily formed.

Figure 19:
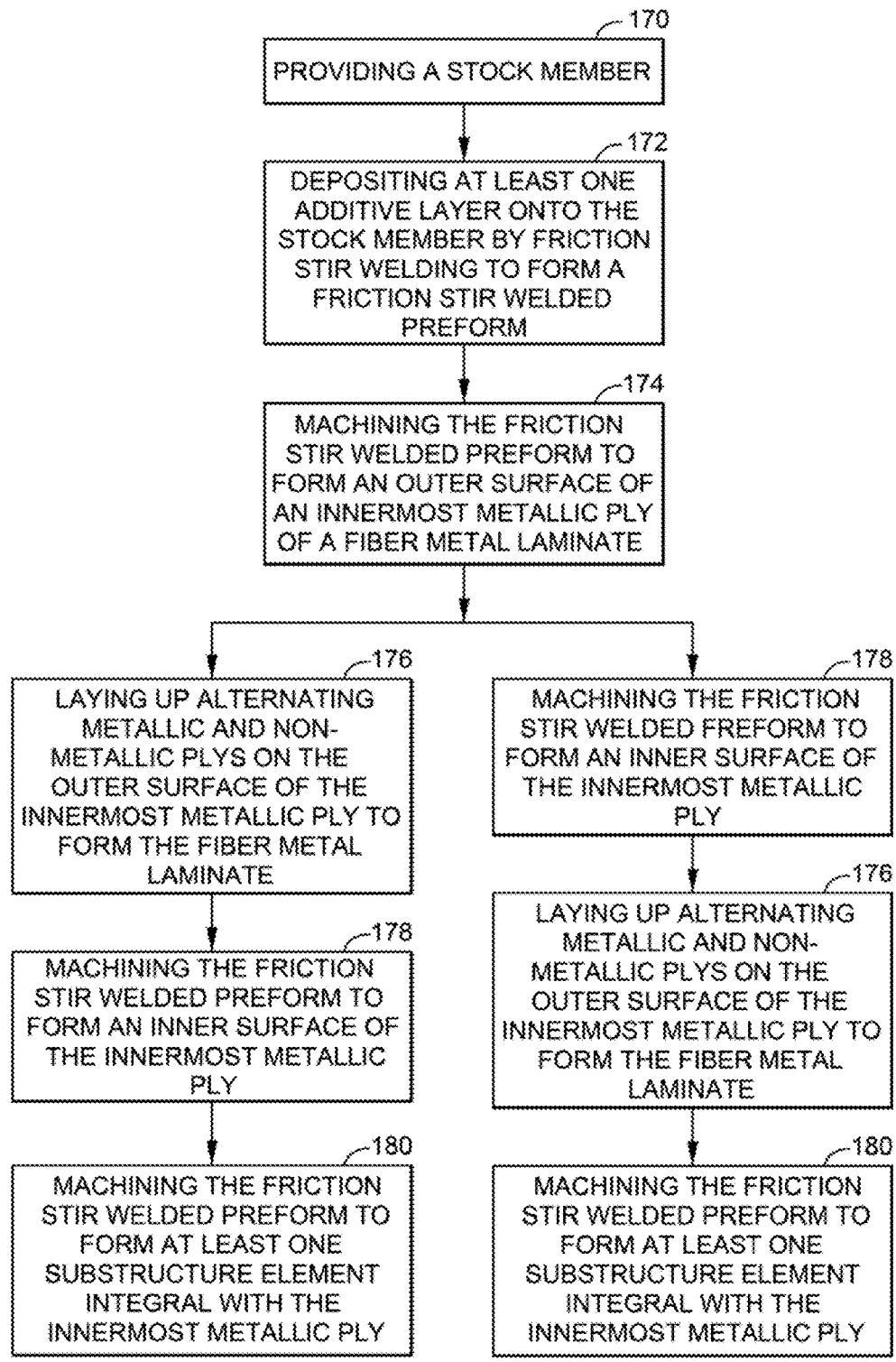
FIG. 19 is a flow chart illustrating a methodology of forming a unitized assembly in a further embodiment.

Referring to FIG. 19, shown is a methodology for forming the unitized assembly 10 illustrated in FIGS. 7-13 wherein step 170 of the method comprises providing the stock member 70 which, in a preferable embodiment, is fabricated of low cost plate stock formed of any suitable material such as aluminum. Step 172 comprises depositing at least one additive layer 30 such as the first additive layer 32 onto the stock member 70 by friction stir welding in the manner described above to form the friction stir welded preform 36. Step 174 comprises machining the friction stir welded preform 36 to form the outer surface 22 of the innermost metallic ply 20 of the fiber metal laminate 12.

Step 176 of the methodology illustrated in FIG. 19 may further comprise laying up metallic and non-metallic plies 14, 16 on the outer surface 22 of the innermost metallic ply 20 in order to form the fiber metal laminate 12 portion of the friction stir welded preform 36. Alternatively, the methodology may comprise the step of machining the friction stir welded preform 36 in order to form the inner surface 24 of the innermost metallic ply 20 prior to laying up the fiber metal laminate 12 portion of the friction stir welded preform 36. Regardless of the order in which steps 176 and 178 are performed, the methodology may further include step 180 comprising machining the friction stir welded preform 36 to form at least one substructure element 40 which is preferably integrally formed with the innermost metallic ply 20. It should also be noted that prior to machining the outer surface 22 of the innermost metallic ply 20, the friction stir welded preform 36 may be machined to form the inner surface 24 as well as the substructure elements 40 such that the inner surface 24 and substructure elements 40 are integrally connected. Subsequent to the machining of the innermost metallic ply 20 and the substructure elements 40, the outer surface 22 may be machined and the alternating metallic and non-metallic plies 14, 16 may be laid up to form the fiber metal laminate 12.

Referring to FIGS. 14-17, shown is a unitized assembly 10 fabricated in a further embodiment comprising a fiber metal laminate 12 and at least one substructure element 40 integrally formed therewith such as by integrally machining from a single stock member 70. For example, FIG. 14 illustrates the stock member 70 as a rectangular plate from which the outer surface 22 of the innermost metallic ply 20 may be formed by any suitable means such as machining. FIG. 15 illustrates the addition of the alternating metallic and non-metallic plies 14, 16 that comprise the fiber metal laminate 12 which are laid up over the outer surface 22 of the innermost metallic ply 20. In this regard, the outer surface 22 of the innermost metallic ply 20 as illustrated in FIG. 14 acts as a mold 72 over which the fiber metal laminate 12 may be formed. The stock member 70 is preferably fabricated of a suitable material such as aircraft grade aluminum in order to generate the innermost metallic ply 20 for the fiber metal laminate 12.

Following laying up of the metallic and non-metallic plies 14, 16, the fiber metal laminate 12 is integrated into the stock member. More specifically, the remaining portion of stock material to which the fiber metal laminate 12 is bonded becomes the raw material from which the substructure elements 40 are machined. Such substructure elements 40 may be formed in any suitable manner and into any shape such as the above-described stiffeners 42 and stringers.

Figure 20:
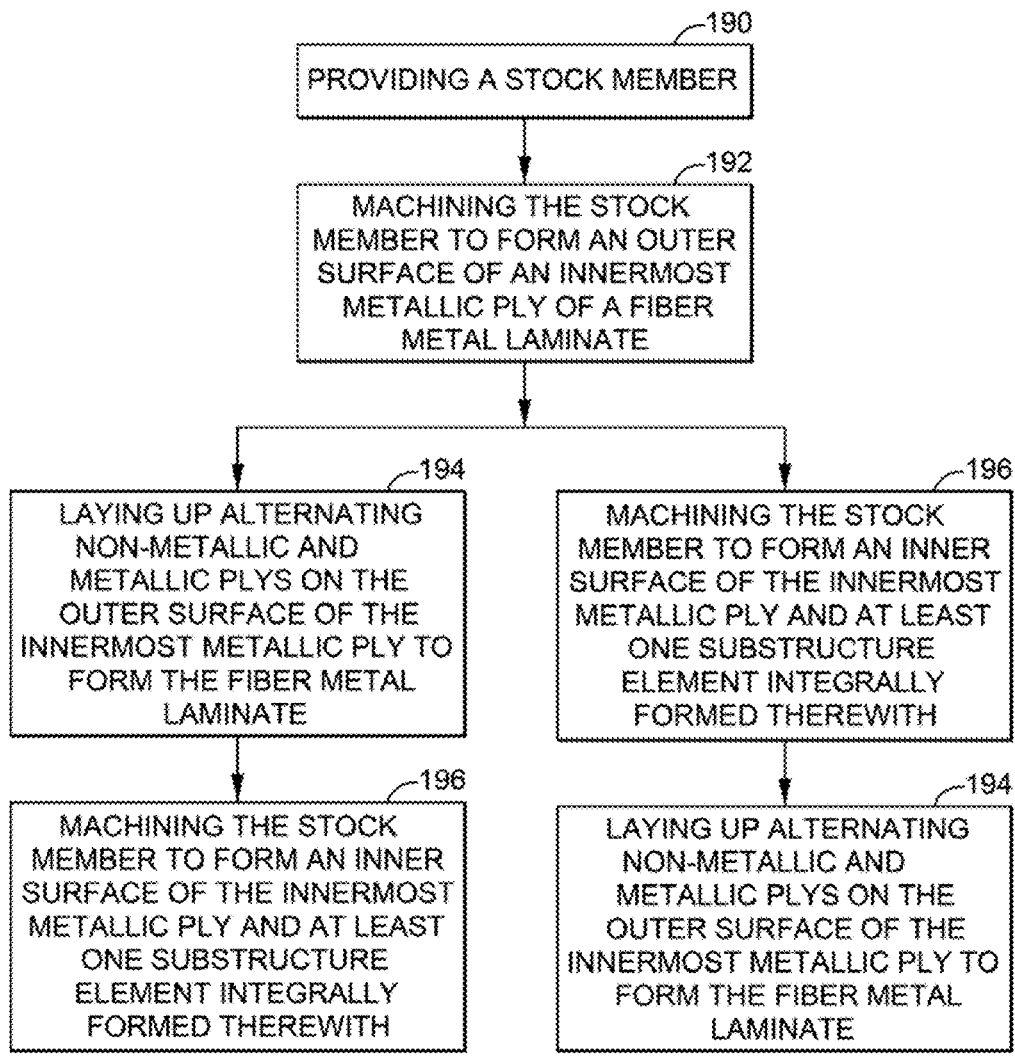
FIG. 20 is a flow chart illustrating a methodology of forming a unitized assembly in an additional embodiment.

Referring briefly to FIG. 20, shown is a methodology for forming a unitized assembly 10 in accordance with the illustrations of FIGS. 7-13. Step 190 of the methodology comprises providing the stock member 70 which may be any suitable stock member 70 encompassing the final shape of the unitized assembly 10 in its machined form. Step 192 comprises machining the stock member 70 to form the outer surface 22 of the innermost metallic ply 20 of the fiber metal laminate 12. Step 194 comprises laying up alternating metallic and non-metallic plies 14, 16 over the outer surface 22 of the innermost metallic ply 20 to form the fiber metal laminate 12. Alternatively, following machining of the outer surface, the stock member 70 may be machined to form the inner surface 24 of the innermost metallic ply 20 and may include the substructure elements 40 integrally machined therewith in step 196. Step 192 of machining the outer surface 22 may occur after machining of the inner surface 24 of the innermost metallic ply 20 and formation of the substructure elements 40.

Figure 21:
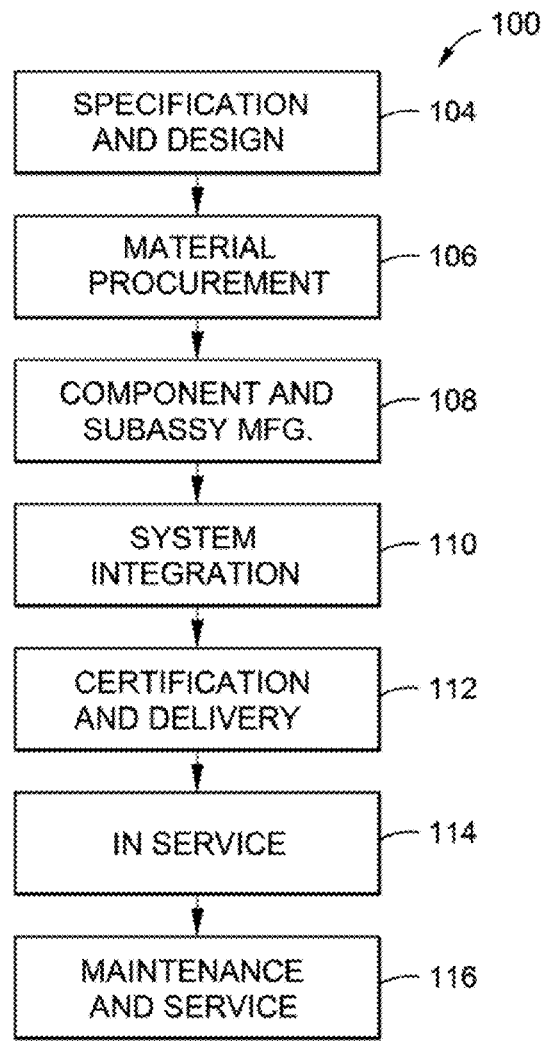
FIG. 21 is a flow diagram of an aircraft production and service methodology.
Figure 22:
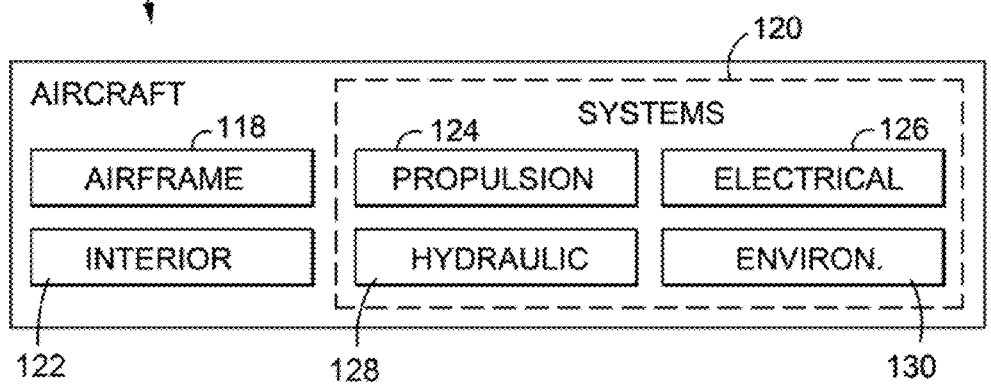
FIG. 22 is a block diagram of an aircraft.

Referring to FIGS. 21-22, embodiments of the disclosure may be described in the context of an aircraft manufacturing and service method 100 as shown in FIG. 21 and an aircraft 102 as shown in FIG. 22. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosed embodiments may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The above description is given by way of example and not limitation. Given the above disclosure, one skilled in the art could devise variations that are within the scope and spirit of the embodiments as disclosed herein. Furthermore, the various features of the embodiments disclosed herein can be used alone or in varying combinations with each other and are not intended to be limited to the specific combinations described herein. Thus, the scope of the claims is not to be limited by the illustrated embodiments.

What is claimed is:

1. A method of forming a unitized assembly, comprising the steps of:
   providing a fiber metal laminate having non-metallic plies bonded to metallic plies and having at least one innermost metallic ply;
   depositing, by friction stir welding, a first additive layer onto the innermost metallic ply at a thickness less than successively-applied additive layers, the innermost metallic ply having a thickness greater than the thickness of the remaining metallic plies;
   generating, when depositing the first additive layer, a weld nugget smaller than the weld nugget joining the first additive layer to a successively-applied additive layer such that a lower edge of the weld nugget boundary for the first additive layer is located above a first non-metallic ply; and
   successively depositing and joining a plurality of the successively-applied additive layers in a stack onto the first additive layer by friction stir welding such that the innermost metallic ply is on a bottom of the stack, the additive layers and the innermost metallic ply comprising a friction stir welded preform, each additive layer being a unitary structure prior to depositing on the stack, the additive layers collectively forming a substructure element, the joining of the additive layers to the innermost metallic ply and to each other being limited to joining by friction stir welding.

2. The method of claim 1 wherein the innermost metallic ply and the additive layer define an interface therebetween, the step of depositing the additive layer onto the innermost metallic ply by friction stir welding comprising the steps of:
   orienting a probe transversely relative to the interface such that the probe extends into the additive layer; and
   rotating the probe while moving the probe along the interface to form a weld joint.

3. The method of claim 1 further comprising the step of:
   machining at least one substructure element into the friction stir welded preform.

4. The method of claim 1 further comprising the step of:
   machining the friction stir welded preform to form an inner surface of the innermost metallic ply; and
   machining the friction stir welded preform to form at least one substructure element integral with the innermost metallic ply.

* * * * *